July 13, 1965  J. BADER  3,193,978
HEAT SEALING THERMOPLASTIC PACKAGES
Filed Jan. 22, 1962  4 Sheets-Sheet 1
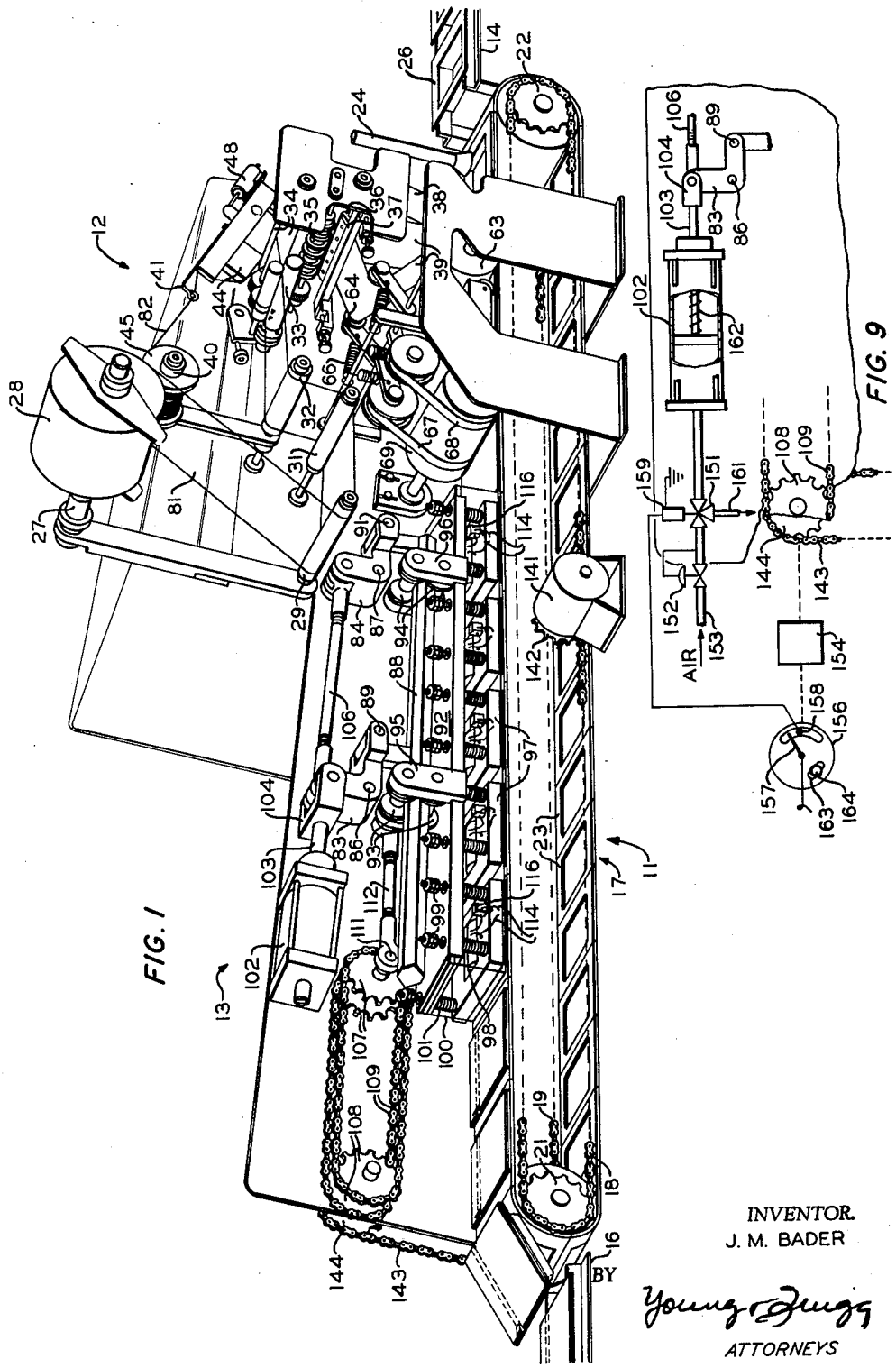
INVENTOR.
J. M. BADER
BY
Young & Thompson
ATTORNEYS July 13, 1965 J. BADER 3,193,978
HEAT SEALING THERMOPLASTIC PACKAGES
Filed Jan. 22, 1962 4 Sheets-Sheet 2

INVENTOR.
J. M. BADER

BY Young & Jugg

ATTORNEYS

July 13, 1965          J. BADER          3,193,978
HEAT SEALING THERMOPLASTIC PACKAGES Filed Jan. 22, 1962          4 Sheets-Sheet 3

INVENTOR.
J. M. BADER

BY
Yoemg & Jugg
ATTORNEYS

July 13, 1965 J. BADER 3,193,978
HEAT SEALING THERMOPLASTIC PACKAGES
Filed Jan. 22, 1962 4 Sheets-Sheet 4
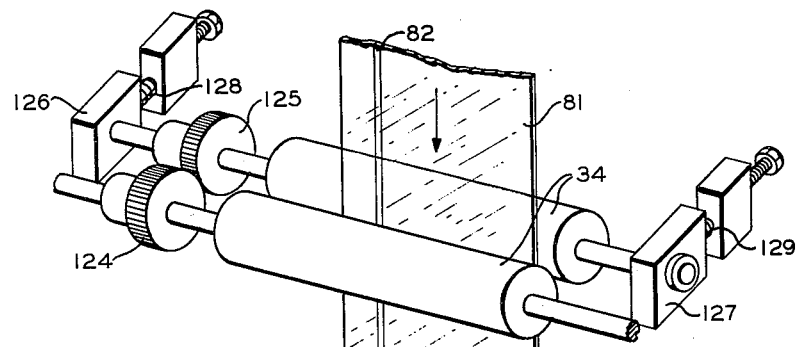
FIG. 5
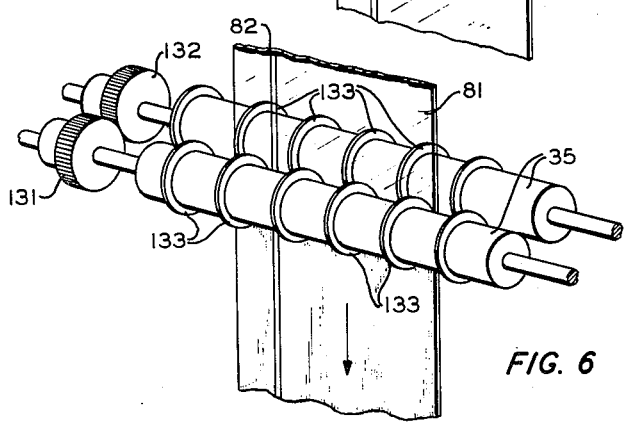
FIG. 6
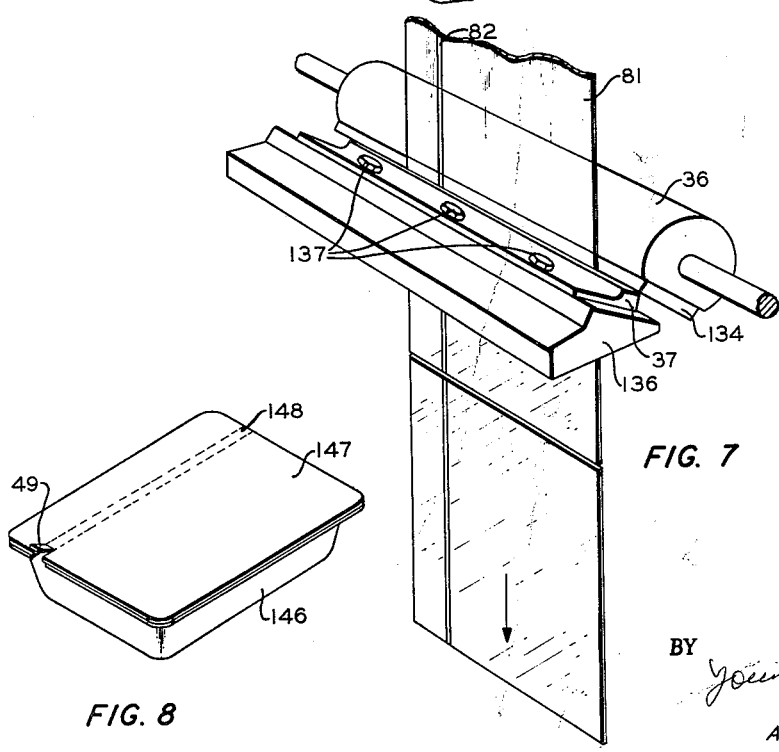
FIG. 7
FIG. 8
INVENTOR.
J. M. BADER
BY
ATTORNEYS

United States Patent Office 3,193,978
Patented July 13, 1965

3,193,978
HEAT SEALING THERMOPLASTIC PACKAGES
Julius Bader, Mountainside, N.J., assignor to Phillips
Petroleum Company, a corporation of Delaware
Filed Jan. 22, 1962, Ser. No. 167,685
10 Claims. (Cl. 53—14)

This invention relates to heat sealing thermoplastic members. In one aspect the invention relates to a method for sealing thermoplastic packages utilizing a plurality of heat sources which move parallel with and synchronized with the packages to be sealed through a sealing zone, moving the sealing elements into engagement with corresponding packages to be sealed, removing the elements from contact with the packages and returning them as a unit in the opposite direction to their initial position. In another aspect this invention relates to an improved packaging machine which conveys packages to be sealed along a predetermined path parallel with and synchronized with heat-sealing elements which are moved into heat-sealing engagement, following which the heat-sealing elements are moved out of engagement as a unit and the entire group moved together in the direction opposite to the movement of the packages to their initial position. In another aspect this invention relates to a method for applying sealing covers to packages including the steps of providing a plurality of longitudinally-spaced, parallel pairs of slits, attaching a continuous tear strip to the sheet by heating and pressing the strip to the sheet longitudinally thereof between the slits, and cutting the sheets transversely at each pair of slits thereby forming individual covers having tear strips and starting tabs. In another aspect this invention relates to means for making covers for thermoplastic packages and applying the covers to the packages, including means for forming a plurality of pairs of parallel slits, each pair longitudinally spaced along the sheet, means to seal a continuous tear strip to the sheet, the tear strip extending between each pair of slits and means to cut the sheet transversely at each pair of slits, thereby forming individual covers having tear strips and starting tabs and means to apply these covers to a moving file of packages to be sealed.

Thermoplastic films and sheet materials are very useful for packaging many types of commodities, one well known example being food products. One of the advantages of the use of thermoplastic materials is that heat sealing can be utilized to fabricate and seal the packages, whether bags, boxes, wrapped coatings, etc. In producing satisfactory heat seals the proper combination of pressure, temperature and timing is very important to make certain the seal is made effectively and the packaged material is not damaged. It is also important that the machinery which forms and seals the packages is as compact and economical as is consistent with efficient and reliable operation.

An object of this invention is to provide effective heat sealing of thermoplastic packages.

Another object of this invention is to provide a novel method for heat sealing of thermoplastic materials.

Another object of this invention is to provide novel heat-sealing apparatus.

Other aspects, objects and the several advantages of this invention are apparent upon study of the specification, the drawing and the appended claims.

According to my invention there is provided a method for sealing thermoplastic packages by passing a file of the packages through a sealing zone; passing a plurality of separate heat sources parallel with and synchronized with the packages, deviating the path of the heat sources to move the sources into sealing engagement to seal the packages, lifting all of the heat sources as a unit and moving the entire group counter to the movement of the file of packages out of contact with the packages, and repeating the above steps to seal a group of packages.

According to my invention thermoplastic packages are sealed as they are conveyed through a sealing zone by a unitary assembly comprising several sealing heads, by passing the heads in contact with a corresponding number of the packages and moving the packages and the sealing heads together through a portion of the sealing zone in contact with each other, moving the sealing heads out of contact with the packages by moving the entire unit, returning the unit backward along the path of movement of the packages, again moving it into contact with a group of the packages and repeating these operations to provide a continuous operation.

Also according to my invention, tear strip covers are provided for packages by cutting longitudinally-spaced pairs of slits in a sheet of cover material, heat sealing a tear strip to the sheet so that it passes between the slits, and then cutting the sheet transversely at the slits to form individual covers having attached tear strips and starting tabs.

Further according to my invention, there is provided a complete heat-sealing machine comprising conveying means for packages, means to apply tear strip covers as described above, and means to heat seal the covers to the packages, also as described above.

In the drawing, FIGURE 1 is a perspective view, partially diagrammatic, of a complete heat-sealing machine according to my invention.

FIGURE 5 is a perspective view of a pair of rollers used to apply a tear strip to the sheet of cover material.

FIGURE 6 is a perspective view of corrugated rollers used to add a resistance to deformation to the cover material.

FIGURE 7 is a perspective view of a sealer roller for the cover material.

FIGURE 8 is a perspective view of a package sealed according to my invention.

FIGURE 9 is a diagrammatic view of suitable control mechanism for vertical displacement of sealing heads.

Figure 4:
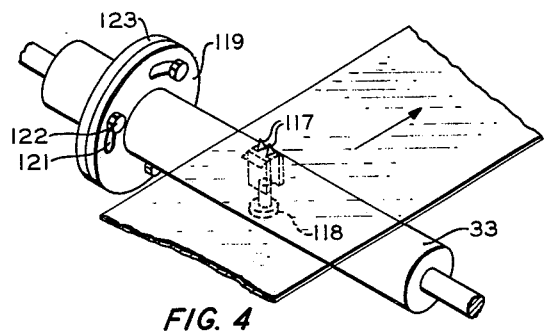
FIGURE 4 is a perspective view of a cutter roller.

As illustrated in FIGURE 1, the entire machine comprises a package-conveying section 11, a lid-forming and applying section 12, and a sealer section 13. Conveying section 11 includes a package delivery conveyor 14, a package removal conveyor 16 and a sealing section conveyor 17. Section 17 comprises chains 18 and 19, pairs of sprockets 21 and 22, and a plurality of package receptacles 23 supported between chains 18 and 19. A package-filling conduit 24 feeds the desired commodity into the empty packages 26.

Figure 2:
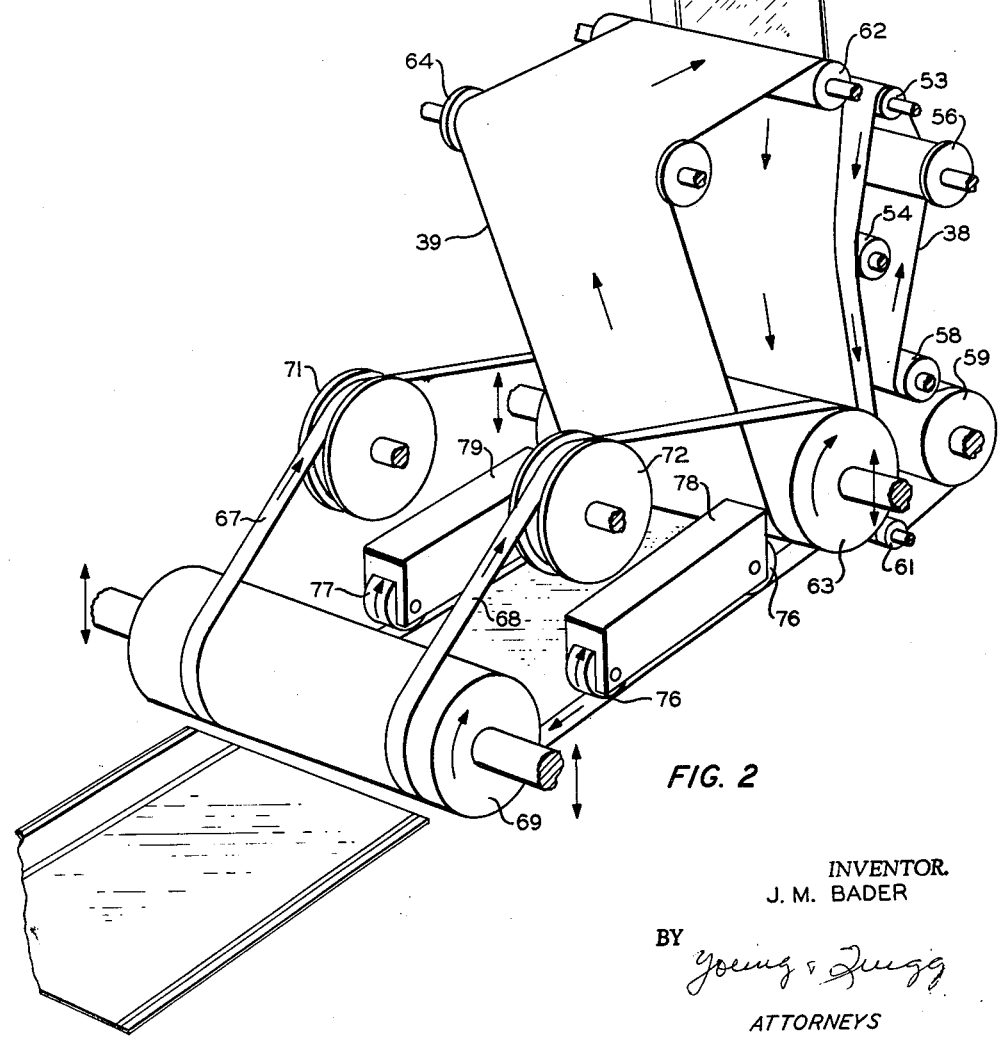
FIGURE 2 is a diagrammatic perspective view of a portion of the cover-applying and packaging section of the machine of FIGURE 1.
Figure 3:
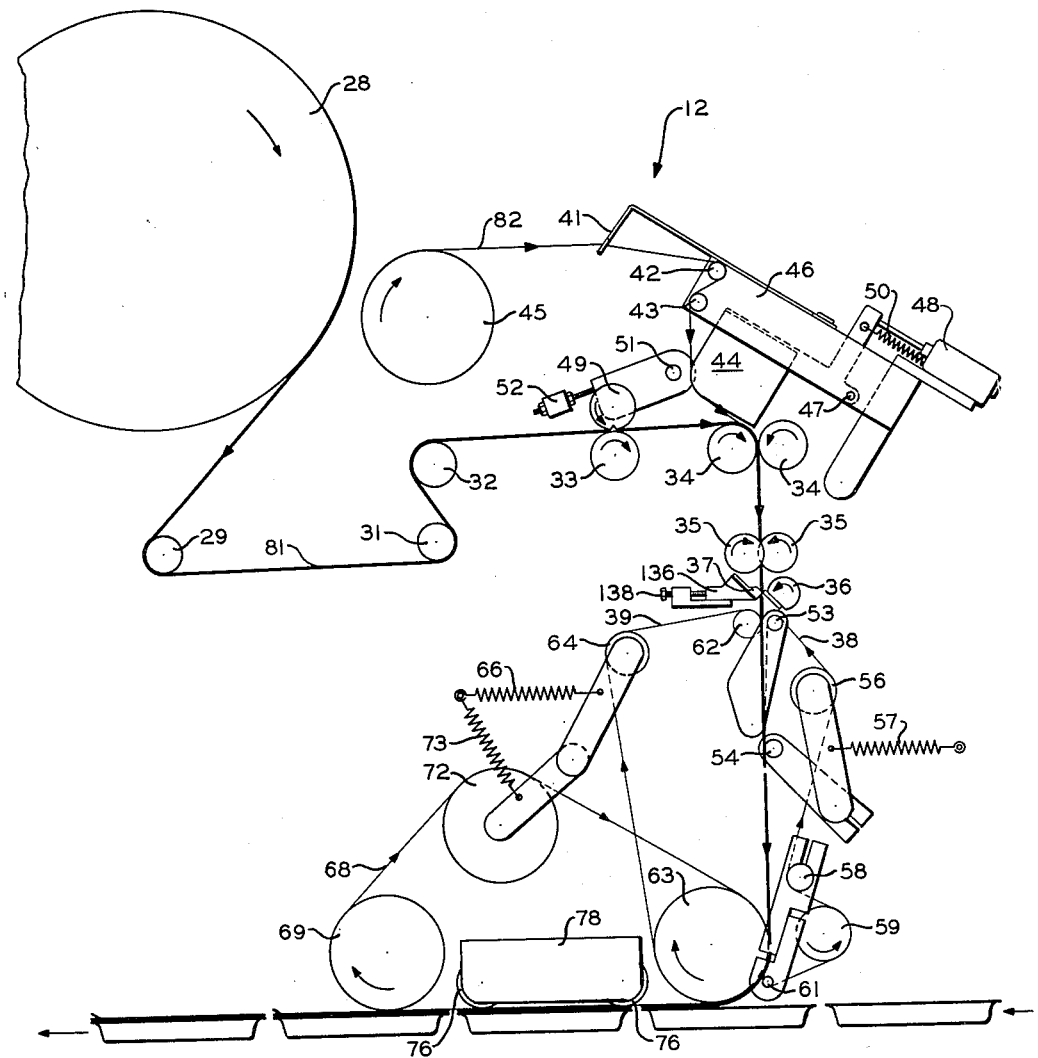
FIGURE 3 is a diagrammatic elevation illustrating the processing of the cover material and tear strip material to form and apply individual tear strip covers to the packages.

As illustrated in FIGURES 1, 2 and 3, section 12 comprises support 27 for supply roll 28 of cover material 81, idler rollers 29, 31 and 32, cutter roller 33, presser rollers 34, corrugating rollers 35, shearing roller 36 and corresponding adjustable shear bar 37, and belts 38 and 39 for handling the cover material 81. Section 12 also includes a support 40 and supply roll 45 for tear strip material 82, guide 41, idler rollers 42 and 43, heater 44 for handling tear strip material 82, and bringing it into contact with cover sheet material for sealing thereto. Guide 41, idler rollers 42 and 43, and air cylinder 48 are supported on a frame 46. Heater 44 is mounted on frame 46 by pivoted support 47. Air cylinder 48 holds heater 44 in contact with the tear strip material in normal operation; but when the machine stops, the supply of air to this cylinder is cut off and the spring 50 moves the heater out of engagement with the tear strip material to prevent overheating. Roller 49 is provided with a pivoted support 51 and is pressed against cutter roller 33 by weight 52. Belt 38 travels over adjustable rollers 53, 54 and 61, belt tightener 56 which is biased by spring 57, snub roller 58 and drive roller 59. Belt 39 travels over adjustable roller 62, drive roller 63 and belt tightener 64 which is biased by spring 66. Tack-sealing metal tapes 67 and 68 also are driven by roller 63 and extend around roller 69 and tape tighteners 71 and 72 which are biased by springs 73. Heat is transmitted to tapes 67 and 68 by rollers 76 and 77 from heaters 78 and 79, respectively.

Energy is supplied to drive the various portions of the cover-forming and applying sections by supplying power to drive rollers 33, 34, 35, 36, 59 and 63 at synchronized speeds, the remainder of the rollers being driven by contact with the sheet material or the driven belts.

In operation the continuous sheet of material 81 is threaded around idler rollers 29, 31 and 32, over cutter roller 33, down between presser rollers 34 and corrugating rollers 35, and between belts 38 and 39. A continuous strip of tear tape material 82 is threaded through guide 41, around idler rollers 42 and 43, against the surface of heater 44 and through pressure rollers 34. As sheet material 81 passes over roller 33, pairs of closely-spaced slits are formed in the material at intervals, the spacing of which is determined by the size of roller 33. Guide 41 is positioned so that tape material 82 is fed between the slits from the roller 33. Since this material is heated as it passes over heater 44, it is sealed to the cover material as it passes through rollers 34, thus forming a continuous sheet of cover material having a continuous tear strip attached thereto longitudinally and with pairs of slits on either side of the tear strip at spaced intervals. As the combined sheet and tear strip material pass through corrugating roller 35, temporary corrugations are formed in this material so that it continues to travel straight downward even though its lower end is severed. The cutting occurs as roller 36 rotates to bring its cutting blade adjacent adjustable shear bar 37. Roller 36 is adjusted on its shaft so that the shearing action occurs adjacent each pair of slits which are cut by cutter roller 33. In this manner individual covers are fed between belts 38 and 39, each cover having a tear strip attached thereto, and by means of the slits in the cover material a starter tab is provided for the tear strip. Preferably, belts 38 and 39 are driven at a linear speed slightly greater than that with which the sheet material 81 approaches these belts. Thus, as each cover is severed from the continuous sheet, a slight spacing occurs between individual covers. The individual covers are fed from between belts 38 and 39 to the individual packages as they progress in package receptacles 23 along the package-sealing section conveyor 17. The covers are pressed in place by sealing tape 67 and 68. Since heat is supplied from heaters 79 and 78, through rollers 76 and 77 to the sealing tapes, the covers are tack-sealed along two edges to the packages.

In sealer, FIGURE 1, a pair of bell cranks 83 and 84 are provided with pivoted supports 86 and 87, respectively, and in turn support guide bar 88 by pivoted supports 89 and 91. A support plate 92 is supported by guide bar 88 by means of pairs of rollers 93 and 94, rotating in brackets 95 and 96, respectively, attached to support plate 92. A plurality of individual sealing heads 97 are positioned with respect to support plate 92 by bolts 99 and springs 101. Each sealing head 97 is provided with a heater such as electrical heater 98, a source of electrical energy such as lead wires 114, and thermostatic control means such as thermoswitch 116. Each of bolts 99 fits loosely in support plate 92 and is attached rigidly to the corresponding sealing head 97. Springs 101 urge the sealing heads 97 away from the support plate 92. Thus, when the sealing unit is forced downward against the packages to be sealed, each sealing head 97 is pressed against the corresponding package by the springs 101 but is permitted to adjust vertically to compensate for variations in thickness of the packages, slight misalignment of the package receptacles, etc.

Preferably, a curtain 100 is provided and extends over the face of all of the sealing heads 97, normally slightly spaced therefrom, and heat is supplied from the heads to the packages through this curtain which is pressed in contact with the sealing head by contact with the package. A preferred material for curtain 100 is a glass cloth impregnated with polytetrafluoroethylene, but other materials are suitable. For example, a polyethylene terephthalate curtain or a curtain of thin heat-conductive metal can be used. Of course, my invention also is applicable to machines in which no curtain is provided and the uncovered metal sealing surfaces of the sealing heads are utilized directly. On the other hand, individual curtains can be provided for each sealing head. In this instance the curtain extends across the face of each individual sealing head, slightly spaced therefrom. Suitable coated sealing heads can also be used, for example heads coated with polytetrafluoroethylene.

The use of curtain 100 prevents sticking of the material being sealed to the sealing heads, both by reason of being a material which of itself helps to prevent sticking and also because the slightly-spaced flexible curtain tends to peel away from both the package and the sealing head rather than being jerked away over a large area at one time.

An air cylinder 102 is connected with bell crank 83 by rod 103 and clevis 104. Cranks 83 and 84 are connected together by connecting link 106. Sprockets 107 and 108 are pivotally supported and sprockets 107 are provided with a mechanical drive. Chains 109 extend around sprockets 107 and 108 and are driven thereby. A drive lug 111 is attached to front chain 109 and to a drag link 112, which also is connected with support plate 92.

In the operation of the sealer section 13, sprockets 107 and 108 are driven at such a speed and chain 109 and drive lug 111 so positioned that, as the lug 111 travels along the lower path of the chain, support plate 92 is pulled to the left in FIGURE 1 along the direction of travel of the packages in sealing section conveyor 17, and each sealing head 97 positioned directly above the corresponding package to be sealed. As lug 111 travels around sprocket 107, air cylinder 102 is actuated to drive rod 103 to the right, thus pivoting bell cranks 83 and 84 to lower guide bar 88 and thus support plate 92 and sealing heads 97 thereon into contact with the packages to be sealed. Air cylinder 102 can be actuated, for example, by a solenoid valve in an air supply line actuated by an electrical circuit, including a switch operated by lug 111. As guide lug 111 travels around sprocket 108, air cylinder 102 is actuated to retract rod 103 and lift the entire sealing mechanism from contact with the packages. The entire mechanism then is driven to the right and counter to the direction of travel of the file of packages in sealing section conveyor 17. Another control system for cylinder 102 is illustrated in FIGURE 9, described below.

In the particular machine illustrated, the distance between the vertical center lines of sprockets 107 and 108 is equal to the distance spanned by two package pockets and the linear distance around one of the sprockets 107 and 108 is equal to the linear distance spanned by a single pocket. Thus, sealing heads 97 are in contact with the packages to be sealed as they travel forward a distance equal the span of two pockets; the packages travel forward a distance equal to one-half the span of a pocket as the guide lug 111 travels from the lowermost position to the uppermost position on sprocket 108; the packages travel through two complete pocket spans as the lug travels between sprockets 108 and 107; and the packages move forward another one-half span as the lug traverses the distance from the uppermost point to the lowermost point of sprocket 107. Thus, from the time sealing heads 97 are first moved out of contact with the packages at the lowermost point of sprocket 108 until they are moved back into contact with the packages at the lowermost point of sprocket 107, the packages have moved forward a distance of three pocket spans, while the sealing heads have moved backward a distance of two pocket spans. Thus, the relative motion between the two is equal to five pocket spans, and since five sealing heads are provided on the sealer assembly each package is contacted a single time. Additional contact time can be provided by lengthening the distance between sprockets 107 and 108 and adding sealing heads. The number of sealing heads is equal to two times the distance between sprockets 107 and 108 plus the linear circumference of a single sprocket, the distance being expressed in pocket spans. Of course, these distances should be adjusted so that a whole number of sealing heads is used and the heads come down in register with the traveling packages each time. The sealing operation is completely controlled since the temperature of the sealing heads is controlled, the speed of travel of the packages is controlled, and the number of pocket spans for which the sealers are in contact can be regulated by adjustment of the parts of the machine.

Since all of the individual sections of the machine must be synchronized, it is preferable that the entire assembly be driven from a single source, such as a single electric motor through non-slip drives such as gear trains or chains. For example, motor 141 drives chain 18 by sprocket 142. A chain 143 is driven by a sprocket (not shown) on the same shaft as sprockets 21, and in turn drives chain 143 and sprocket 144 on the same shaft as sprockets 108. A similar drive can be provided for lid forming and applying section 12. To simplify the description and the drawings many details of the synchronized drive train are not shown since such gear train and chain drives can be readily assembled by one skilled in the art.

FIGURE 4 shows details of cutter roller 33 including a pair of cutter blades 117, adjustable for depth of cut by screw 118, and provision for radial adjustment of roller 33 for proper timing including a mounting plate 119 attached to roller 33 and provided with arcuate slots 121 through which mounting bolts 122 are attached to drive plate 123.

FIGURE 5 shows some details of presser rollers 34 including gears 124 and 125 and a spring-loaded mounting for one of the rollers, including bearing plates 126 and 127 which are spring biased by springs 128 and 129.

FIGURE 6 illustrates corrugating rollers 35 and their drive gears 131 and 132 showing the alternately spaced corrugating rings 133 which cause a transverse undulation or corrugation to be formed in the continuous sheet material 81 so that the loose end which occurs each time a transverse cut is made by shear roller 36 and shear bar 37 continues vertically and is fed between belts 38 and 39 rather than possibly curling or bending and thus interfering with the continuous operation of the machine.

FIGURE 7 shows shearing roller 36 and its attached shear bar 134. This figure illustrates the provision for adjustment of the shear bar 37 on stationary plate 136 by means of adjusting bolts 137. Plate 136 can be moved horizontally by screws 138 (see FIGURE 3). If desired, provision can be made to rotate roller 36 on its shaft for proper timing.

FIGURE 8 illustrates a completed sealed package including container 146 and lid 147. Lid 147 includes tear strip 148 and starting tab or pull tab 149.

FIGURE 9 illustrates control mechanism for actuating air cylinder 102 at the proper time to move support plate 92 into position for sealing just as it starts its forward movement and to lift plate 92 from sealing position as it reaches the forward end of its movement. The control mechanism comprises a three-way solenoid valve 151 and a regulator 152 in air supply line 153 which is connected to a suitable source of air under pressure (not shown). A gear box 154 is driven from some portion of the mechanism, as for example the shaft on which sprockets 108 are attached. The output of gear box 154 is adapted to make one complete revolution for one complete revolution of lug 111. That is, the output of gear box 154 makes one complete revolution for one complete revolution of chain 109. A rotary contactor 156 is driven by gear box 154 and its sliding contact 157 makes one complete revolution for one complete revolution of chain 109. An arcuate stationary contact 158 is provided to maintain a complete circuit for the desired amount of time during which the sealing heads, attached to support plate 92, are pulled forward in synchronism with the traveling packages. When the contact is made to complete the circuit from contact 157 and contact 158 to the solenoid 159 of valve 151, this valve is actuated to position valve 151 for direct flow of air from pipe 153 to cylinder 102. When the contact is broken, valve 151 returns to its normal position in which cylinder 102 is connected with a vent 161. Cylinder 102 preferably is provided with a spring 162 to cause the mechanism to return when the air is vented therefrom. Regulator 152 maintains a desired operating pressure in air cylinder 102 and can be adjusted to provide the preferred sealing pressure by the sealing heads 97 pressing against the packages to be sealed. Rotary contactor 156 is provided with an arcuate slot 163 and a bolt 164 so that the plate on which arcuate contact 158 is mounted can be rotated for fine adjustment of the timing. Alternatively, cylinder 102 can be double acting, in which case suitable valving is provided to alternately pressure and vent the two sides of the piston.

As noted above, proper seal conditions are provided by controlling the length of the contact path, requiring adjustment of the machine itself, including the distance between sprockets 107 and 108 and the number of sealing heads on support plate 92, the speed of travel of the packages through the sealing zone which, of course, is accomplished by adjustment of the speed of the entire machine, and the temperature of the sealing heads 97. Preferably, thermoswitches 116 are adjustable to permit variation in the temperature to which these heads are heated. The contact pressure can be adjusted by moving the lock nuts which are illustrated on bolts 99 or by replacement of springs 101 with springs having a different compression factor. Where desired, suitable preheating means can be provided for the packages or the cover film.

My invention has particular utility when applied to the sealing of thermoplastic containers by applying thermoplastic covers and sealing the covers to the containers, but also is applicable to sealing other types of packages, for example bags which are sealed by joining the two edges of an open end, and wrapped objects which are sealed by joining portions of the wrapper to itself. The sealer section 13 also can be used with other types of cover feeding apparatus. For example, in some instances, a continuous sheet cover film is fed over the packages and the seal formed prior to cutting the individual covers apart. Sealer section 13 also is applicable to such an operation. Lid forming and applying section 12 also can be used for other types of package sealing means, although lid forming and applying section 12 and sealer section 13 when used together form a particularly desirable combination of elements for a package-feeding machine.

Materials suitable for use to form the seal between the package and the cover include broadly heat-sealable materials. Of particular utility in practicing my invention are thermoplastic materials and laminates of thermoplastic film. Examples of materials which can be employed include polyethylene, which is especially well suited for sealing materials or for use with polyethylene containers and with containers of other materials, either heat-sealable or nonheat-sealable. My invention can be practiced utilizing an aluminum package with a cover made of heat-sealable material or utilizing a strip of sealing material either on the lower surface of the cover, the upper surface of the container, or both. For example, an aluminum container can be sealed with a cover of polyethylene aluminum laminate. Although the bond between the polyethylene and the aluminum normally is not as strong as the bond made, for example, between polyethylene and polyethylene, it is suitable for many types of packaging. Other types of nonheat-sealable material can be used when combined with a thermoplastic material; for example, cardboard can be used to form the cover of the package and polyethylene, for example, used to form the seal. For example, a polyethylene-coated cardboard cover can be placed on a cardboard package and a suitable seal obtained or, for example, a polyethylene-coated cardboard cover can be applied to a polyethylene package. Thus, various combinations of cover and container can be utilized, provided there is a layer of thermoplastic at the interface between the cover and the container and the materials at that point are capable of bonding to thermoplastics when heat is applied.

Preferably the tear strip 82 is made of a material which can be heat-sealed to the cover and have sufficient strength to supply the force required to break the material of the cover. A particularly suitable material is polyethylene terephthalate, commercially available under the trade name "Mylar." Preferably, this material is coated with a relatively low softening point thermoplastic such as polyethylene to facilitate obtaining a heat seal between the strip and the cover sheet.

Reasonable variation and modification are possible within the scope of my invention which sets forth method and apparatus for heat sealing thermoplastic packages by conveying the packages parallel with and synchronized with heat-sealing elements, applying a force to cause heat-sealing engagement between the packages and the elements, and withdrawing the elements as a unit and moving them backward along the line of travel of the packages to contact additional packages, novel cover-forming and applying apparatus and method and package-sealing apparatus.

I claim:

1. A method for sealing thermoplastic packages which comprises:
   passing a file of packages to be sealed through a sealing zone;
   passing through said sealing zone separate heat sources parallel with and synchronized with said file of packages;
   during the parallel passage of said packages and said heat sources, applying a force to cause simultaneous contact of said file of sources with a first group of packages of said packages to seal said first group of packages simultaneously while said packages and said sources are in parallel movement;
   moving said heat sources out of contact with said first group of packages and moving simultaneously all of said sources counter to the movement of said file of packages while out of contact with said file of packages;
   again passing all of said heat sources parallel with and synchronized with said file of packages and applying a force to cause simultaneous contact of said sources with a second group of packages of said file of packages to seal said second group of packages; and
   repeating the above steps to seal subsequent groups of packages in said file to effect continuous operation.

2. A method for sealing thermoplastic packages which comprises:
   passing a file of packages to be sealed through a sealing zone;
   passing through said sealing zone separate heat sources parallel with and synchronized with said file of packages;
   during the parallel passage of said packages and said heat sources, applying a force to cause simultaneous contact of said sources with a first group of packages of said file of packages to seal said first group of packages simultaneously while said packages and said sources are in parallel movement;
   moving said heat sources out of contact with said first group of packages and moving simultaneously all of them counter to the movement of said file of packages while out of contact with said file of packages;
   again passing all of said heat sources parallel with and synchronized with said file of packages and applying a force to cause simultaneous contact of said sources with said packages on the first unsealed package and subsequent packages; and
   repeating the above steps to seal each package in said file.

3. A method for sealing thermoplastic packages which comprises:
   passing a file of packages to be sealed through a sealing zone;
   applying covers to said packages;
   passing heat sources through said sealing zone parallel with and synchronized with said file of packages;
   during the parallel passage of said packages and said heat sources, applying a force to cause simultaneous contact of said sources with said covers to seal a first group of packages of said file of packages simultaneously while said packages and said sources are in parallel movement;
   moving simultaneously all of said heat sources out of contact with said first group of packages and moving simultaneously all of said sources while out of contact with said file of packages counter to the movement of said file of packages;
   again passing all of said heat sources parallel with and synchronized with said file of packages and applying a force to cause simultaneous contact of said sources with said covers to seal a second group of packages of said file of packages; and
   repeating the above steps to seal subsequent groups of packages in said file to effect continuous operation.

4. A method for sealing packages which comprises:
   passing a file of packages to be sealed through a sealing zone;
   passing a cover sheet continuously through a cover preparing zone;
   in said cover preparing zone rotating a knife to form a pair of closely spaced, longitudinal slits in said sheet at regular longitudinally spaced intervals;
   heating a tear strip and applying said strip to said sheet longitudinally thereof extending between said pairs of slits;
   cutting said sheet and said applied tear strip at said pairs of slits thereby forming individual package covers each having a tear strip and a starting tab formed by said slits; and
   applying said covers to said packages and sealing thereto.

5. A package sealing machine comprising:
   means to convey a file of packages to be sealed along a predetermined path;
   means to convey sealing elements for said file of packages parallel with and synchronized with said file of packages;
   heating means for said sealing elements;
   means to force said sealing elements simultaneously into sealing engagement to seal a first group of said packages; and
   means to move said sealing elements out of engagement with said first group of packages and return them counter to the movement of said file of packages out of contact with said file of packages.

6. Means for sealing covers to a moving file of packages comprising:
means to place said covers in place on said packages;
a plurality of sealing elements resiliently attached in linear relationship to a unitary structure;
means to move said structure forward in synchronization with said file of packages;
means to force said unitary structure toward said file of packages to move said sealing elements simultaneously into sealing engagement with a first group of said file of said packages; and
means to move said unitary structure away from said file of packages to move said sealing elements out of engagement with said first group of packages and to return said unitary structure to its initial position.

7. A package sealing machine comprising:
means to convey containers to be sealed in a file along a predetermined path;
means to apply covers on said containers;
a plurality of sealing elements;
heating means in each of said sealing elements;
a unitary structure to support said sealing elements;
resilient mounting means to attach each of said sealing elements to said unitary structure;
a guide bar;
means constraining movement of said unitary structure at right angles to said bar but permitting movement longitudinally with respect to said bar;
means to move said structure in the direction of motion of said file of packages and in the opposite direction thereto;
means to move said bar toward said file of packages when said structure is moving in the direction of movement of said file of packages and to move said bar away from said file of packages when the movement of said structure is counter to the movement of said file of packages.

8. A package sealing machine comprising:
a conveyor to move a file of packages to be sealed along a predetermined path;
means to supply a continuous sheet of cover material and to move said material continuously through a cover preparing zone;
a rotary cutter to form pairs of parallel slits in said sheet, equally spaced longitudinally along said sheet;
means to supply a continuous tear strip;
means to heat said strip and apply it to said sheet to form a bond therewith;
a cutter to sever said sheet and said applied strip at said pairs of slits thereby forming a plurality of package covers having a tear strip and a starting tab therefor; and
means to apply said covers to said packages and to seal said covers to said packages.

9. A package sealing machine comprising:
a conveyor to move a plurality of packages to be sealed in a horizontal file;
means to apply thermoplastic covers to said packages;
means to seal said covers to said packages comprising a plurality of sealing elements;
a heater in each of said sealing elements;
a unitary structure to support said sealing elements;
spring-biased resilient support means to attach each of said sealing elements to said unitary structure;
a horizontal guide bar;
a first pair of rollers attached to said unitary structure and engaging the upper and lower surfaces of said bar;
a second pair of rollers attached to said unitary structure spaced horizontally from said first pair of rollers and contacting the upper and lower surfaces of said bar;
a pair of sprockets having their vertical center lines spaced horizontally a distance equal to a desired amount of forward travel of said sealing elements;
a chain engaging both of said sprockets and extending therebetween;
a drive pin attached to said chain;
a drag link attached to said pin and to said unitary structure;
a pair of bell cranks each having a fixed pivot axis and being pivotally connected with said bar at horizontally spaced intervals;
a connecting link pivotally connected with both of said bell cranks;
means to drive said sprockets in synchronism with said conveyor to move said sealing elements in synchronism with said packages in the direction of movement thereof and to move said sealing elements in the opposite direction as said pin is conveyed around and between said sprockets; and
means to rotate said bell cranks to cause downward movement of said guide bar as said unitary structure begins motion in the direction of movement of said packages and to move said bell cranks to raise said guide bar as said unitary structure reaches the end of its movement in the direction of movement of said packages and begins its reverse movement.

10. A package sealing machine comprising:
a conveyor to move a file of packages to be sealed along a predetermined path continuously;
means to supply a continuous sheet of cover material continuously;
means to pass said cover material continuously over a continuously running roller having a sequence of cutters which engage the cover material to slit said cover material at regular intervals equally spaced longitudinally along said material;
means to supply a continuous tear strip;
means to heat said strip and apply it to said material to form a bond therewith;
a cutter to sever said sheet and said applied strip at said pairs of slits, thereby forming a plurality of package covers having a tear strip and a starting tab therefor;
means to synchronize the operation of said means to supply said cover material and said conveyor whereby said covers are applied to said packages in proper sealing register; and
means to seal said covers to said packages.

References Cited by the Examiner

UNITED STATES PATENTS

| 2,538,564 | 1/51 | Jensen et al. | 53—133 X |
|---|---|---|---|
| 2,638,724 | 5/53 | Harvey | 53—14 |
| 2,699,285 | 1/55 | Bell | 229—51 |
| 2,815,620 | 12/57 | Prodigo | 53—14 |
| 2,919,060 | 12/59 | Daniels | 229—51 |
| 2,958,168 | 11/60 | Vogt | 53—184 X |
| 3,001,348 | 9/61 | Rado | 53—373 X |
| 3,017,729 | 1/62 | Cheeley | 53—184 X |

FRANK E. BAILEY, *Primary Examiner.*

EARL J. DRUMMOND, TRAVIS S. McGEHEE,
*Examiners.*

Notice of Adverse Decision in Interference

In Interference No. 95,756 involving Patent No. 3,193,978, J. Bader, HEAT SEALING THERMOPLASTIC PACKAGES, final judgment adverse to the patentee was rendered July 1, 1968, as to claim 5.

[*Official Gazette August 20, 1968.*]